United States Patent
Mayer et al.

(10) Patent No.: US 9,063,033 B2
(45) Date of Patent: Jun. 23, 2015

(54) SENSOR HOUSING FOR USE WITH GAS TURBINE ENGINES

(71) Applicant: Solar Turbines Incorporated, San Diego, CA (US)

(72) Inventors: Matthew Allen Mayer, San Diego, CA (US); Daniel William Carey, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 126 days.

(21) Appl. No.: 13/796,892

(22) Filed: Mar. 12, 2013

(65) Prior Publication Data

US 2014/0260572 A1     Sep. 18, 2014

(51) Int. Cl.
    *G01M 15/14*     (2006.01)
(52) U.S. Cl.
    CPC .................................... *G01M 15/14* (2013.01)
(58) Field of Classification Search
    CPC .................................................. G01M 15/14
    USPC ........................................ 73/112.01, 112.03
    See application file for complete search history.

(56) References Cited

U.S. PATENT DOCUMENTS

| | | | | |
|---|---|---|---|---|
| 4,413,519 A | * | 11/1983 | Bannister et al. | 73/660 |
| 4,907,456 A | * | 3/1990 | Rozelle | 73/660 |
| 4,914,953 A | * | 4/1990 | Viscovich | 73/660 |
| 7,765,875 B2 | * | 8/2010 | Guo | 73/724 |
| 7,841,237 B2 | * | 11/2010 | Suzuki et al. | 73/623 |
| 2003/0051553 A1 | | 3/2003 | Matsuyama et al. | |
| 2003/0159446 A1 | | 8/2003 | Parker et al. | |
| 2006/0162423 A1 | | 7/2006 | Ruth | |
| 2007/0056353 A1 | | 3/2007 | Weyl et al. | |
| 2010/0139286 A1 | | 6/2010 | Gerward et al. | |
| 2010/0217541 A1 | | 8/2010 | West | |
| 2012/0011936 A1 | * | 1/2012 | Hurst et al. | 73/702 |
| 2013/0091940 A1 | * | 4/2013 | Shang et al. | 73/112.01 |
| 2014/0053574 A1 | * | 2/2014 | McConkey | 60/803 |
| 2014/0060198 A1 | * | 3/2014 | Hurst et al. | 73/700 |
| 2014/0125791 A1 | * | 5/2014 | Arellano et al. | 348/82 |

FOREIGN PATENT DOCUMENTS

JP        2002005439 A    1/2002
WO        2008138828      11/2008

* cited by examiner

*Primary Examiner* — Eric S McCall
(74) *Attorney, Agent, or Firm* — Finnegan, Henderson, Farabow, Garrett & Dunner, LLP

(57) ABSTRACT

A sensor housing is provided. The sensor housing includes an elongated body having an open end and a closed end. An opening is disposed axially within the elongated body through the open end and is configured to receive a sensor secured therein. A support section is connected to the closed end of the elongated body and coupled to a receiving port disposed on the gas turbine engine system. The elongated body has an axial dimension determined according to a vibration characteristic of the gas turbine engine system during operation.

17 Claims, 6 Drawing Sheets

SENSOR HOUSING FOR USE WITH GAS TURBINE ENGINES

TECHNICAL FIELD

The present disclosure is directed to a sensor housing and, more particularly, to a sensor housing for a gas turbine engine.

BACKGROUND

A turbine engine system often includes a gas producer and a power turbine. The gas producer includes a combustion chamber for producing a high-pressure gas flow by burning a fuel supply. The high temperature, high pressure gas flow is directed into the power turbine, driving the power turbine to produce output power. Thus, monitoring and controlling the combustion chamber is important for proper operation of the turbine engine system.

Combustion instabilities in gas turbine systems can produce intolerably large pressure waves, which may lead to fatigue and failure of components and costly outages and repair. An acoustic sensor is often used to measure the dynamic pressure within the combustion chamber. The acoustic sensor provides the measurement to be used to monitor, detect, and correct instabilities before they cause serious damages. However, it is difficult to directly measure dynamic pressure within the combustion chamber due to the high temperature, high pressure environment.

U.S. Patent Application Publication No. US 2010/0139286 A1 discloses a burner including a pressure measurement device for measuring pressure in a gas turbine. The pressure measurement device includes a measuring point defining a location of the pressure measurement. The measuring point is located inside the burner of the gas turbine.

Because existing sensor components may not withstand the temperature and pressure generated within the combustion chamber, the acoustic sensor in existing turbine engine systems is often located remotely from the combustion chamber to avoid damages to the sensor. Thus, existing combustion monitoring systems require a transfer tube to transfer the pressure from the combustion chamber to the sensor. In order to prevent resonance from interfering with measurements, sensor is also connected to a semi-infinite coil, which when, filled with water due to condensation and water wash, may result in erroneous measurements. As a result, there is a need for a combustion monitoring system that uses an acoustic sensor located near the combustion chamber without an associated semi-infinite coil to directly measure the pressure therein.

SUMMARY

According to one embodiment of the disclosure, a sensor housing is provided. The sensor housing includes an elongated body having an open end and a closed end. An opening is disposed axially within the elongated body through the open end and configured to receive a sensor secured therein. A support section is connected to the closed end of the elongated body and coupled to a receiving port disposed on a gas turbine engine system. In addition, the elongated body has an axial dimension determined according to a vibration characteristic of the gas turbine engine system during operation.

According to an alternative embodiment of the disclosure, an apparatus for attaching a sensor to a gas turbine engine system is provided. The apparatus includes a sensor housing coupled to the gas turbine engine system. The sensor housing includes an elongated body having an axial dimension determined according to a vibration characteristic of the gas turbine engine system during operation. The apparatus further includes a sensor disposed within the sensor housing and a mounting nut configured to secure the sensor within the sensor housing.

According to an alternative embodiment of the disclosure, a method for measuring pressure within a gas turbine engine system is provided. According to the method, a sensor housing is coupled to a gas turbine engine system. The sensor housing includes an elongated body having an axial dimension determined according to a vibration characteristic of the gas turbine engine system during operation. A sensor is disposed within the sensor housing and secured within the sensor housing by a mounting nut coupled to the sensor housing. The method further includes collecting pressure measurements from the sensor.

DETAILED DESCRIPTION

Figure 1:
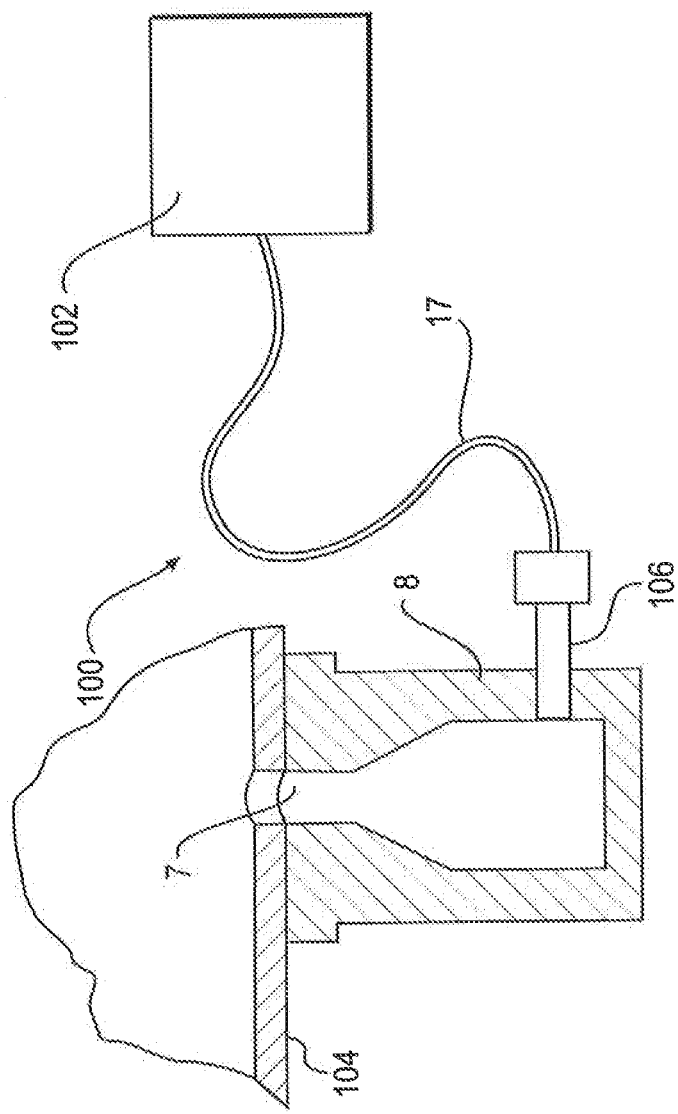
FIG. 1 is a diagram of an exemplary disclosed combustion monitoring system.

FIG. 1 is a diagram of an exemplary disclosed combustion monitoring system 100 for monitoring pressure within a combustion chamber of a gas turbine engine system. Monitoring system 100 includes a sensor apparatus 106, a signal processing unit 102, and a signal transmission wire 17 connecting sensor 3 to signal processing unit 102.

Sensor apparatus 106 may include a piezoelectric sensor or other types of sensor configured to measure pressure imposed thereon by acoustic waves. Sensor apparatus 106 may be mounted to a torch housing 8 associated with a burner module 104 of the turbine engine system. Torch housing 8 includes a torch chamber 7 disposed therein and connected with the combustion chamber within burner module 104. Torch housing 8 may include a cylindrical body, which is closed at one end and open at the other end. Fuel and air are separately fed into torch chamber 7 and mixed with each other therein to produce a fuel-air mixture. The fuel-air mixture is then ignited to provide a torch flame, which is then introduced through the open end of torch housing 8 to the combustion chamber within burner module 104 to ignite the fuel within the combustion chamber. Sensor apparatus 106 may be secured to torch housing 8 through a side wall of the cylindrical body of torch housing 8. According to a further embodiment, sensor apparatus 106 may be disposed along a radial direction of the cylindrical body of torch housing 8.

During operation of the turbine engine system, acoustic waves are generated due to the combustion of fuel within the combustion chamber. The acoustic waves enter torch chamber 7 through the open end of the cylindrical body thereof and impose pressure onto sensor apparatus 106. Sensor apparatus 106 converts the pressure to an electrical signal, which is transmitted to processing unit 102 through transmission wire 17. Alternatively, sensor apparatus 106 may be secured directly to a side wall of burner module 104 and configured to measure the pressure within the combustion chamber.

Processing unit 102 may include known electronic components, such as a processor and a memory, configured to process the electrical signal and generate output indicative of the pressure within the combustion chamber. Processing unit 102 may provide the output to a user through a user interface and allow the user to visualize parameters associated with acoustic waves within the combustion chamber, such as frequency and amplitude of pressure waves. Alternatively, processing unit 102 may provide the output to other system components such a controller of the turbine engine system for the controller to monitor and control the operation of the gas turbine engine.

Figure 2:
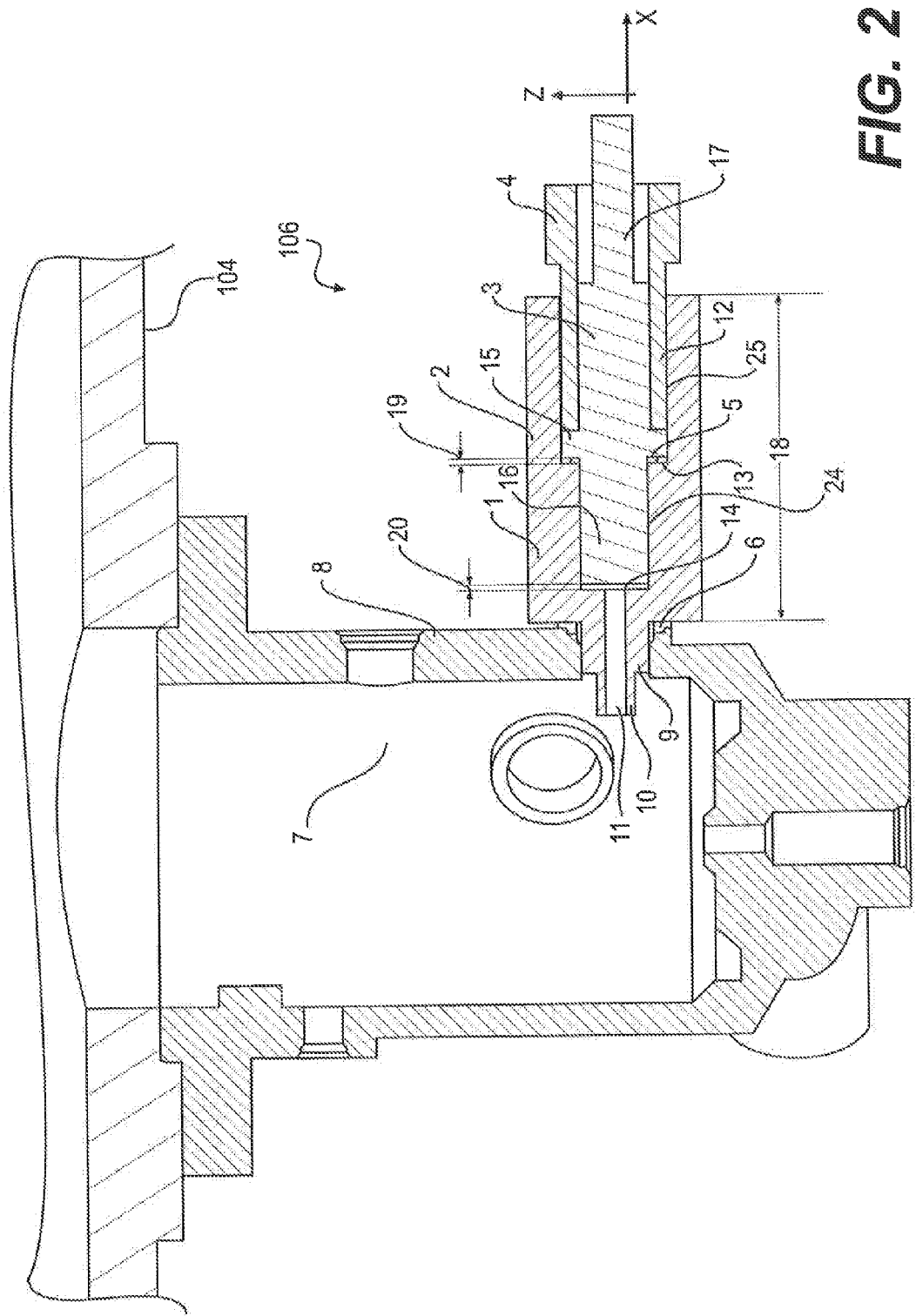
FIG. 2 is a cross-sectional view of an exemplary sensor apparatus for attaching an acoustic sensor to a combustion chamber.
Figure 3:
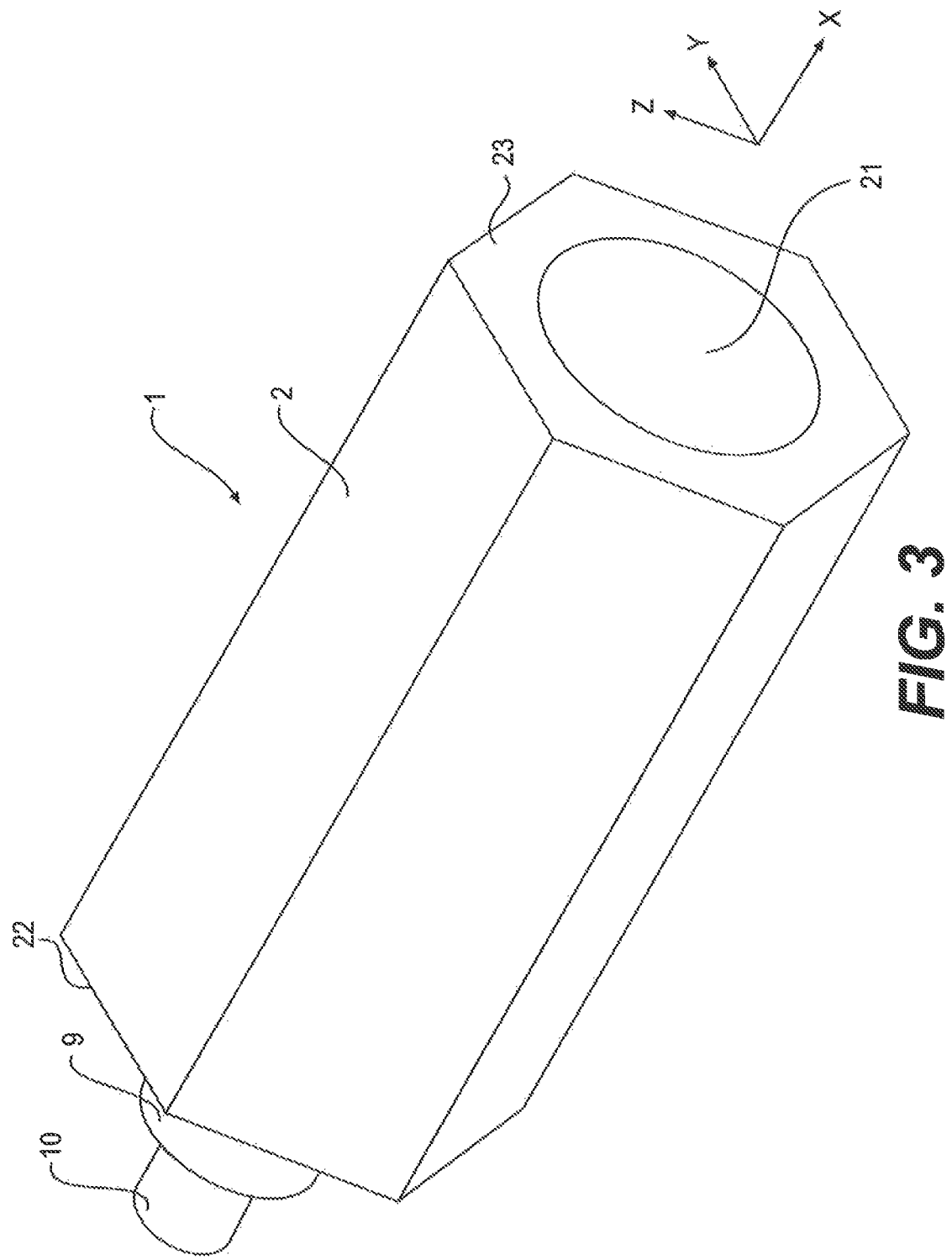
FIG. 3 is a perspective view of the sensor housing of FIG. 2.

FIGS. 2 and 3 depict an exemplary embodiment of sensor apparatus 106 of FIG. 1. Sensor apparatus 106 includes a sensor housing 1 for mounting and securing sensor 3 to torch housing 8. Sensor housing 1 includes an elongated body 2 having a closed end 22 and an open end 23. Open end 23 of elongated body 2 has an opening 21 disposed therein along an axial direction of body 2. Sensor 3 is disposed within opening 21 of housing 1 through open end 23. A step 13 is disposed within opening 21, which divides opening 21 into a first section 24 proximate to closed end 22 of body 2 and a second section 25 proximate to open end 23 of body 2. First section 24 of opening 21 has a diameter generally matching that of a head section 16 of sensor 3 with a proper clearance/tolerance for easy installation.

Sensor 3 may be inserted into body 2 through open end 23 such that head section 16 is received by first section 24 of opening 21. A disc section 15 of sensor 3 rests on step 13 through a washer 5 disposed therebetween. According to one embodiment, a thickness 19 of washer 5 is selected such that a gap 14 between an end wall of first section 24 of opening 21 and head section 16 of sensor 3 is substantially minimized. As a result, head section 16 is substantially close to the end wall of the first section 24 without touching the end wall of first section 24. Alternatively or additionally, an axial dimension 20 of gap 14 may be adjusted by varying the thickness 19 of washer 5. A greater thickness of washer 5 increases gap 14, whereas a smaller thickness of washer 5 decreases gap 14. In one embodiment, the axial dimension of the first section 24 of opening 21 is 24.13 mm with a 0.127 mm tolerance, the thickness 19 of washer 5 is 0.991 with a 0.102 mm tolerance, and the axial dimension of head section 16 of sensor 3 is 24.69 mm with a 0.203 mm inch tolerance. As a result, the axial dimension 20 of gap 14 between the end wall of first section 24 and head section 16 of sensor 3 is 0.432 with a 0.432 mm tolerance.

According to a still further embodiment, second section 25 of opening 21 is threaded. A mounting nut 4 having a threaded section 12, which matches threaded second section 25 of opening 21, is threaded into housing 1 through opening 21. Upon being tightened, mounting nut 4 presses against disc section 15 of sensor 3 to secure sensor 3 within housing 1. Additionally, nut 4 has a through opening provided along the axial direction for guiding transmission wire 17 through nut 4.

Body 2 of housing 1 may have a hexagonal shape as shown in FIG. 3, which allows housing 1 to be rotated using a known mechanical tool. Alternatively, body 2 of housing 1 may have a cylindrical shape having a flat section that matches the mechanical tool. Still alternatively, body 2 of housing 1 may have other shapes and/or structures that allow housing 1 to be rotated using tools known in the art.

As further shown in FIGS. 2 and 3, housing 1 further includes a support section 9 extending outwardly and axially from closed end 22 of housing 1. In one embodiment, support section 9 has a cylindrical shape. An outer surface of support section 9 is threaded and matches a threaded port disposed on a side wall of torch housing 8. Support section 9 may be threaded into the threaded port of torch housing 8 by rotating body 2 of housing 1 using the mechanical tool described above. Thus, housing 1 may be mounted and secured to touch housing 8 through support section 9. Alternatively, the port on the side wall of torch housing 8 and the outer surface of support section 9 may be unthreaded. Support section 9 may be disposed within the port and secured therein through interference fit or through other known techniques.

Additionally, a seal 6 may be disposed between torch housing 8 and sensor housing 1 to provide sealing and prevent leaking between support section 9 and the port of torch housing 8. Seal 6 may be a metal ring having an appropriate cross-sectional shape that matches the port on torch housing 8.

According to a further embodiment, the port on the side wall of torch housing 8 may be oriented along a radial direction of the cylindrical body of torch housing 8. Therefore, when secured to torch housing 8, sensor housing 1 extends radially from the side wall of touch housing 8.

Additionally, as shown in FIGS. 2 and 3, housing 1 may further include a tip section 10 extending outwardly and axially from support section 9 of housing 1. Tip section 10 may have a cylindrical shape, a conical shape, or other appropriate shapes. A radial dimension of tip section 10 may be smaller than that of support section 9. When housing 1 is fully secured to torch housing 8, tip section 10 protrudes through the side wall of torch housing 8 and extends radially within torch chamber 7.

Still additionally, a channel 11 may be disposed along the axial direction of body 2 through tip section 10, support section 9, and closed end 22 of housing 1. More specifically, channel 11 may be a through opening drilled axially through tip section 10, support section 9, and closed end 22 of body 2. When housing 1 is mounted to torch housing 8, channel 11 directs acoustic waves from torch chamber 7 towards head section 16 of sensor 3, thereby exposing head section 16 to the pressure waves within torch chamber 7. Thus, sensor 3 may provide measurements of the pressure and the acoustic waves within combustion chamber 104. In one embodiment, channel 11 has a length of 6.35 mm and a diameter of 2.54 mm. Other dimensions may also be used for channel 11.

Figure 5:
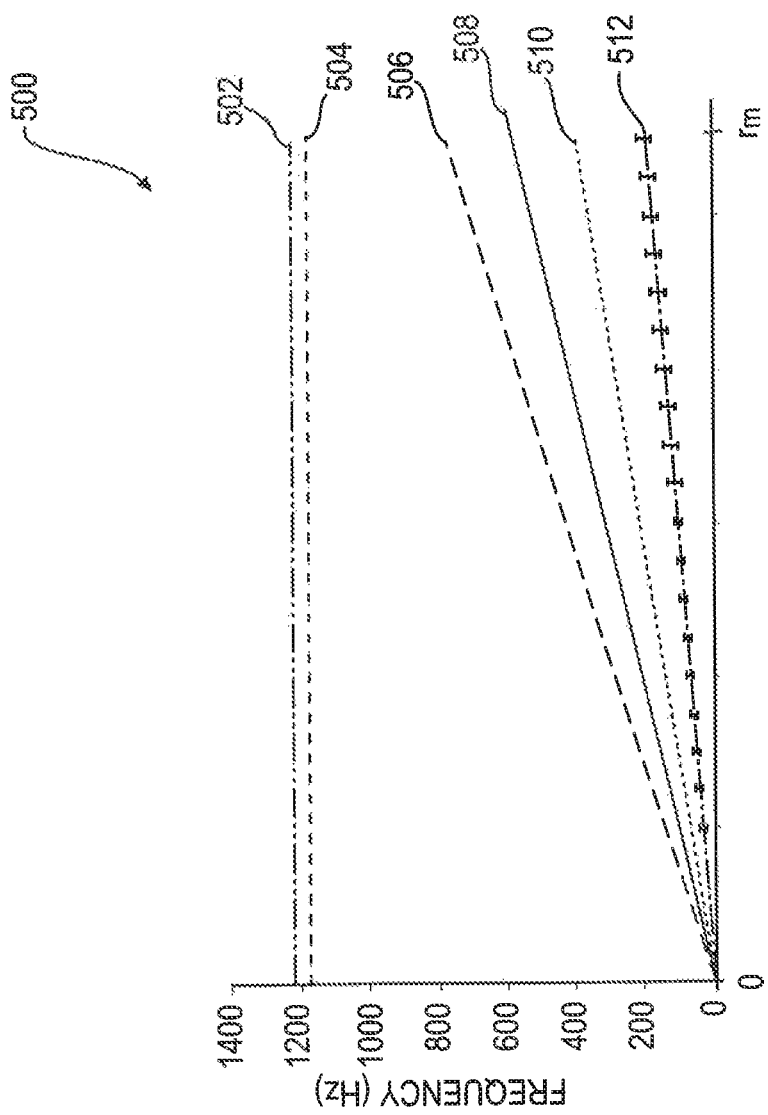
FIG. 5 is a graph illustrating a frequency analysis of the sensor housing of FIG. 2.

According to a still further embodiment, body 2 may have an axial dimension 18 configured to optimize vibration characteristics of housing 1, thereby reducing vibrations of housing 1 caused by operation of the gas turbine engine and avoiding damage to housing 1 and the components associated therewith. More particularly, vibrations associated with the operation of the gas turbine engine may be characterized by engine orders. The term "engine order" herein refers to a frequency component of vibration associated with the operation of the turbine engine. In particular, the vibrations caused by the operation of the turbine engine may include a plurality of frequency components at a given rotational speed of the turbine engine. In general, for a given engine order n, the greater the rotational speed r, the higher the frequency. At a given rotational speed r, the greater the engine order n, the higher the frequency. FIG. 5 is a graph depicting variations of the first four engine orders (506, 508, 510, and 512) as the rotational speed of the turbine engine increases from 0 to a maximum speed $r_m$. According to a further embodiment, the frequency component for the $n^{th}$ engine order may be represented as $$\frac{r}{60} \times n,$$

where r represents the rotational speed of the turbine engine in revolution per minute (rpm). For example, at a rotational speed of 6000 rpm, a first engine order has a frequency of 100 Hz, a second engine order has a frequency of 200 Hz, a third engine order has a frequency of 300 Hz, and so on. According to a still further embodiment, energy of the vibrations associated with the operation of the turbine engine may concentrate primarily in low engine orders. For example, a significant portion of the energy may be associated with the four engine orders.

On the other hand, vibration characteristics of housing 1 may be represented by natural frequencies along given directions. As shown in FIGS. 2 and 3, for example, vibration characteristics of housing 1 may be represented by natural frequencies along three orthogonal directions corresponding to X, Y, and Z axes.

If the natural frequencies of housing 1 are substantially close to or equal to one of the engine orders, housing 1 may be excited by the corresponding engine order during the operation of the turbine engine, resulting in excessive vibrations of housing 1 and causing potential damage to the structure thereof. Thus, in order to reduce the vibration of housing 1 caused by the vibration of the turbine engine, the natural frequencies of housing 1 are set such that they are above the first few engine orders associated with the majority of the vibration energy.

According to a further embodiment, the natural frequency of housing 1 along the X axis is greater than those along the Y and Z axes due to the elongated shape of body 2. Thus, if the natural frequencies along the Y and Z axes are set above a given engine order, the natural frequency along the X axis is ensured to be above that engine order.

In addition, the natural frequencies of housing 1 along the Y and Z axes are related to axial dimension 18 of body 2. In general, reducing axial dimension 18 of body 2 provides relatively greater natural frequencies along the Y and Z axes, while increasing axial dimension 18 provides relatively lower natural frequencies along the Y and Z axes. Thus, axial dimension 18 of body 2 may be designed so that the natural frequencies along the Y and Z axes of housing 1 are set above one or more engine orders.

FIG. 5 illustrates an exemplary frequency plot 500 of natural frequencies of sensor housing 1 and first four engine orders. In FIG. 5, lines 502 and 504 represent the natural frequencies along the Y and Z axes, respectively, for a given axial dimension 18 of body 2. According to one embodiment, axial dimension 18 of body 2 is selected such that lines 502 and 504 are above lines 506-512 within the entire operational range of the rotational speed r. As such, the natural frequencies along the Y and Z axis are above the first four engine orders within the entire operational range of the rotational speed r. Alternatively, axial dimension 18 of body 2 may be selected such that the natural frequencies of body 2 along the Y and Z axes are above a greater or smaller number of engine orders.

According to a further embodiment, axial dimension 18 of body 2 is selected such that the natural frequencies of body 2 along the Y and Z axes are above a selected set of engine orders for turbine engines of various types and models. For example, in one embodiment, axial dimension 18 of body 2 is set to 82.55 mm. Other dimensions may also be used according to the types and models of the gas turbine engines.

According to a still further embodiment, axial dimension 18 of body 2 is selected such that the natural frequencies of body 2 along the Y and Z axes are above not only the selected set of engine orders but also a selected set of engine drivers. Here, an engine driver refers to a frequency at which the amplitude of vibration peaks at or near an engine mounting location. The engine drivers represent frequency components that substantial contribute to the overall vibration of the engine system in addition to the engine orders discussed above. The engine drivers generated by an engine system may be associated with respective engine orders, but different from the associated engine orders. A given engine order may contribute to a number of engine drivers at one or more frequencies that may be slightly below or above the associated engine order or at a frequency that is a non-integer multiple of the associated engine order. For example, the engine drivers associated with the first engine order may be between 90 Hz to 110 Hz or between 250 Hz or 270 Hz. Hence, the axial dimension 18 of body is selected so that the natural frequency of body 2 is above the first two engine orders (e.g., 100 Hz and 200 Hz) as well as the engine drivers associated with the first engine order (e.g., 110 Hz and 270 Hz).

According to a further embodiment, axial dimension 18 of body 2 is selected by a finite element analysis (FEA), as known in the art, to provide the desired vibration characteristics described above. The goal of FEA is to determine the natural frequencies of body 2 during free vibration. The FEA models the vibration characteristics of body 2 using a linear equation system, and provides a representation of the vibration characteristics by solving the linear equation system.

Figure 4:
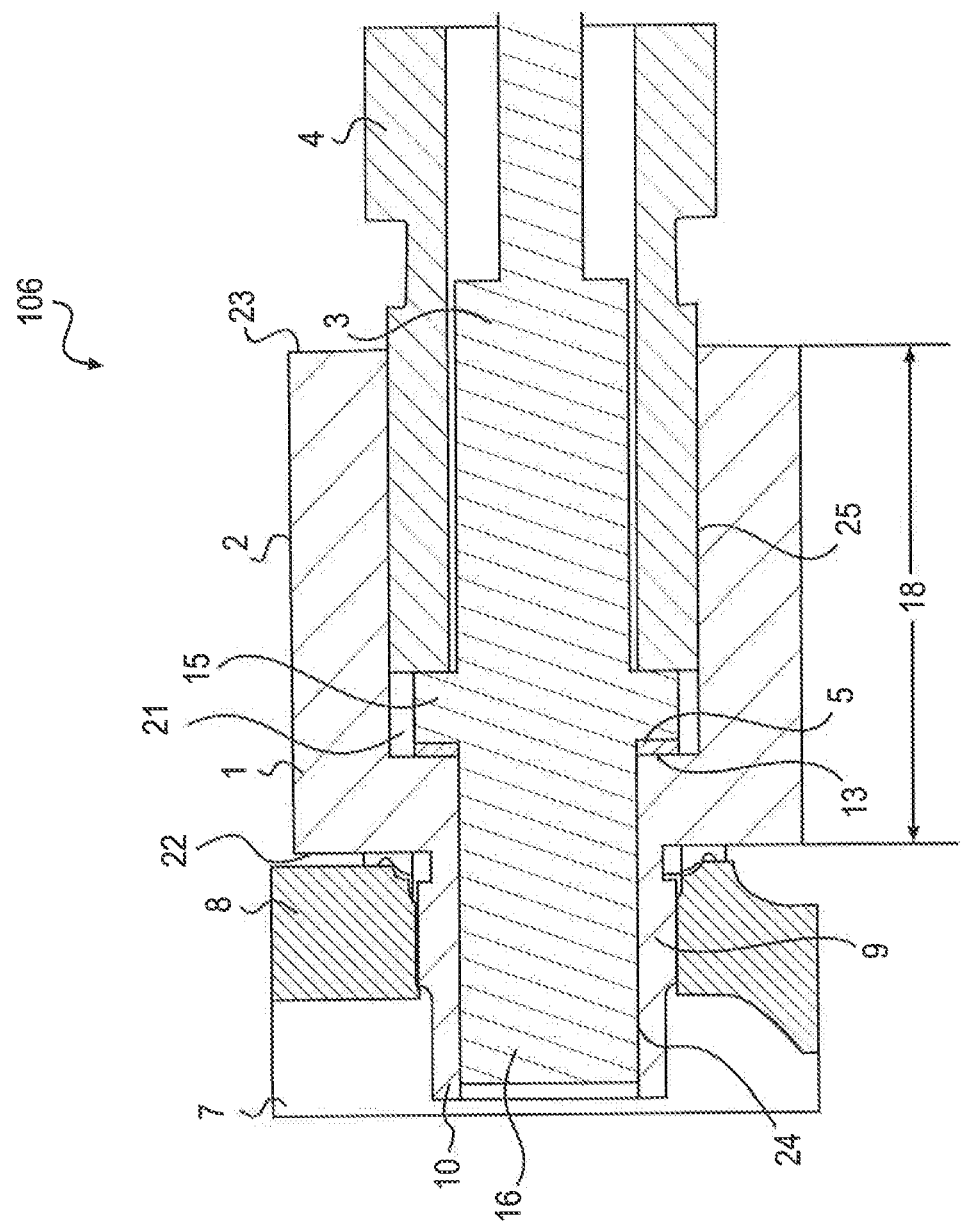
FIG. 4 is a cross-sectional view of another exemplary sensor apparatus for attaching the acoustic sensor to the combustion chamber.

FIG. 4 is a cross-sectional view of another embodiment of sensor housing 1 for attaching and securing pressure sensor 3 to torch housing 8. The same reference numerals in FIG. 4 refer to similar components or structures as those of FIG. 2.

According to FIG. 4, body 2 of sensor housing 1 has an external structure and shape generally corresponding to those shown in FIG. 3. Channel 11 for guiding the pressure and acoustic waves to sensor 3, however, is omitted. Instead, tip section 10 and support section 9 both have sufficient diameters so that first section 24 of opening 21 is disposed through tip section 10, support section 9, and closed end 22 of body 2. When sensor 3 is disposed within body 2 of housing 1, head section 16 of sensor 3 is received by first section 24 of opening 21 and may protrude through the side wall of torch housing 8. As a result, head section 16 of sensor 3 may extend within torch chamber 7 and may be in direct contact with the pressure and acoustic waves therein.

Sensor 3 may be secured within body 2 of housing 1 through mounting nut 4, which presses disc section 15 of sensor 3 against step 13 through washer 5. Mounting nut 4 may have a threaded section, which is threaded and secured within opening 21. Alternatively, mounting nut 4 may be secured within opening 21 through an interference fit.

As described above in connection with FIG. 5, axial dimension 18 of housing 1 may be selected so that the natural frequencies of housing 1 are set above a selected set of engine orders and/or engine drivers through the entire operational range of the rotational speed of the gas turbine engine. Axial dimension 18 may be selected through the HA.

INDUSTRIAL APPLICABILITY

The sensor housing disclosed herein, while being described for use in connection with an a gas turbine engine system, can be used generally in alternative applications and environments. For example, a sensor may be required for measuring parameters in any mechanical or industrial system in a dynamic environment and the disclosed sensor housing may be utilized in such environment.

Figure 6:
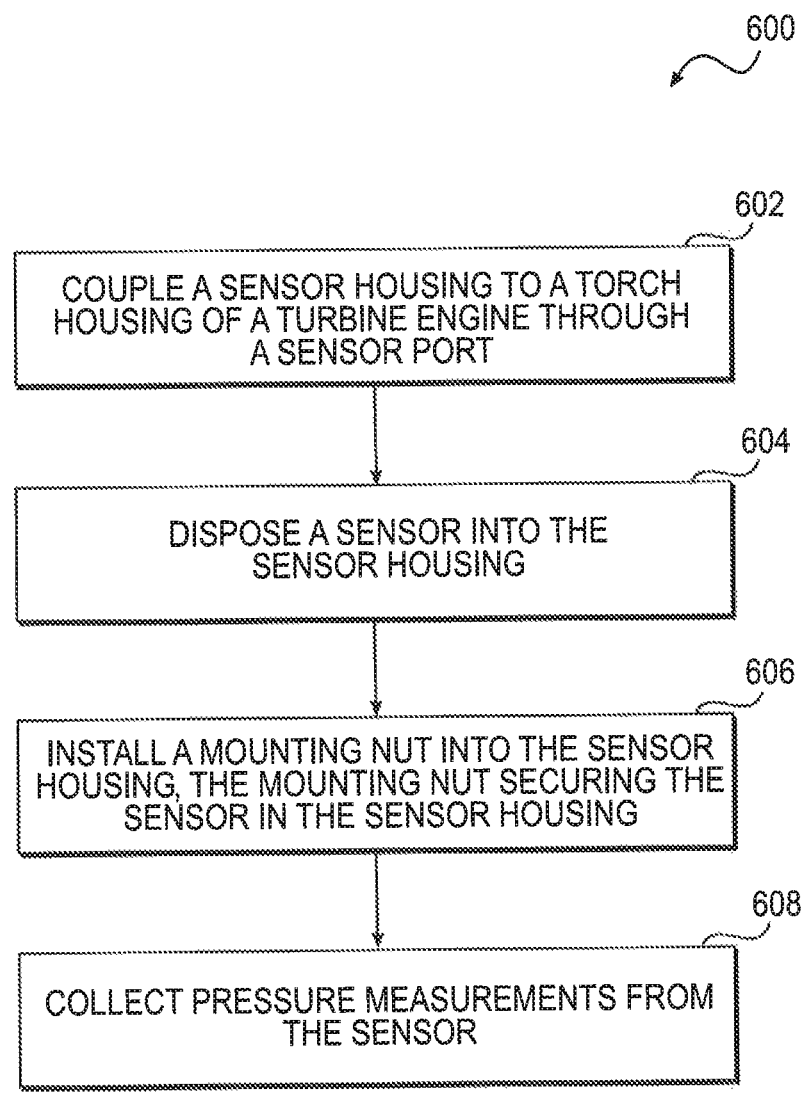
FIG. 6 is a flow diagram illustrating a process for measuring pressure in a gas turbine engine.

FIG. 6 depicts a process 600 for measuring pressure in a combustion chamber of a gas turbine engine. According to process 600, at step 602, sensor housing 1 is coupled to torch housing 8 of the turbine engine. As depicted in FIG. 2, torch chamber 7 of torch housing 8 may be connected to combustion chamber 104 of the turbine engine and receive high pressure air flow therefrom. Sensor housing 1 may be coupled to torch housing 8 through a receiving port disposed on a side wall of the torch housing. The receiving port may be threaded to match the threads on support section 9 of sensor housing 1. Torch housing 1 may be secured to torch housing 8 through the coupling between the receiving port and support section 9. According to a further embodiment, sensor housing 1 extends radially from torch housing 8 when secured thereon. Additionally, a seal 6 may be disposed between sensor housing 1 and torch housing 8 to prevent leaking through the coupling between the receiving port and support section 9 of sensor housing 8.

Sensor housing 1 has an elongated body 2 having an axial dimension 18. Axial dimension 18 may be selected such that vibration characteristics of sensor housing 1 are optimized to minimize excessive vibration of housing 1 during operation of the turbine engine. In particular, axial dimension 18 may be selected so that natural frequencies of sensor housing 1 are above a selected set of engine orders and/or engine drivers. According to one embodiment, axial dimension 18 sets the natural frequencies of sensor housing 1 to be above the first four engine orders, so that the vibration of sensor housing 1 is minimized.

At step 604, pressure sensor 3, such as a piezoelectric device, is disposed within the sensor housing. Head section 16 of sensor 3 is disposed within first section 24 of opening 21, while disc section 15 rests on step 13 within opening 21.

At step 606, mounting nut 4 is installed into sensor housing 1. Mounting nut 4 includes a threaded section 12 that matches the threads in the second section of opening 21. Threaded section 12 of mounting nut 4 may be threaded into opening 21 by rotating mounting nut 4. Additionally, nut 4 has a through opening disposed axially therein. Transmission wire 17 may be guided through the through opening of nut 4. Nut 4 may press against disc section 15 of sensor 3 when fully tightened, thereby securing sensor 3 within housing 1.

At step 608, sensor 3 generates a signal indicative of the pressure within torch chamber 7 and transmits the signal to processing unit 102. The pressure and acoustic waves within torch chamber 7 may be guided to head section 16 of sensor 3 through channel 11 as shown in FIG. 2. Alternatively, head section 16 of sensor 3 may extend through the side wall of torch housing 8 as shown in FIG. 4, so that sensor 3 may directly sense the pressure within torch chamber 7. Processing unit 102 may process and present the pressure measurements to a user through a user interface or provide the pressure measurements to a controller for controlling operation of the turbine engine.

Sensor apparatus 106 disclosed herein allows sensor 3 to be directly attached to torch housing 8 or burner module 104. The transfer tube between the combustion chamber and the sensor in the existing turbine engine systems is not required for coupling the sensor to the torch housing. As a result, sensor apparatus 106 eliminates the need to periodically drain the water condensation from the semi-infinite coil in the conventional systems, in order to prevent erroneous pressure reading. Thus, sensor apparatus 106 provides an improved design to collect the pressure measurements from the torch chamber and the combustion chamber of the gas turbine engine.

Sensor 3, when installed in sensor housing 1, is in direct contact with the acoustic waves within torch chamber 7 or burner module 104. As a result, sensor housing 1 provides more accurate measurements of the pressure within torch chamber 7 or burner module 104. Further, axial dimension 18 of sensor housing 1 may be determined according to a vibration characteristic of the gas turbine engine system during operation. For example, the axial dimension 18 of sensor housing 1 may be selected, so that the natural frequencies of sensor housing 1 are above a desired set of the engine orders and/or engine drivers. Therefore, vibration and damage of sensor housing 1 caused by the operation of the turbine engine system are minimized.

It will be apparent to those skilled in the art that various modifications and variations can be made to the disclosed sensor housing. Others embodiments will be apparent to those skilled in the art from consideration of the specification and practice of the disclosed sensor housing. It is intended that the specification and examples be considered as exemplary only, with a true scope being indicated by the following claims and their equivalents.

What is claimed is:

1. A sensor housing, including:
   an elongated body having an open end and a closed end;
   an opening disposed axially within the elongated body through the open end and configured to receive a sensor secured therein; and
   a support section connected to the closed end of the elongated body, the support section being coupled to a receiving port disposed on a gas turbine engine system and configured to extend through a torch housing of the gas turbine engine system via the receiving port,
   wherein the support section further includes a tip section configured to extend within a torch chamber of the torch housing,
   wherein a channel is disposed axially through the tip section, the support section, and the closed end of the body, the channel being configured to guide acoustic waves from the torch chamber to the sensor, and
   wherein the elongated body has an axial dimension determined according to a vibration characteristic of the gas turbine engine system during operation.

2. A gas turbine engine including a torch housing, the torch housing including a sensor apparatus, the sensor apparatus including a sensor and the sensor housing of claim 1.

3. The sensor housing of claim 1, wherein the opening includes a step dividing the opening axially into a first section and a second section.

4. The sensor housing of claim 3, wherein the first section is proximate to the closed end of the body and receives a head section of the sensor, and the second section is proximate to the open end of the body.

5. The sensor housing of claim 4, wherein the step within the opening receives a disc section of the sensor through a washer disposed therebetween.

6. The sensor housing of claim 4, wherein the first section of the opening is disposed through the tip section, the support section, and the closed end of the body, and the head section of the sensor extends through a side wall of the chamber housing when received by the first section of the opening.

7. A sensor housing, including:
an elongated body having an open end and a closed end;
an opening disposed axially within the elongated body through the open end and configured to receive a sensor secured therein; and
a support section connected to the closed end of the elongated body, the support section being coupled to a receiving port disposed on a gas turbine engine system,
wherein the elongated body has an axial dimension determined according to a vibration characteristic of the gas turbine engine system during operation, and
wherein the axial dimension of the elongated body is configured to set a natural frequency of the elongated body above a selected set of engine orders of the gas turbine engine system.

8. The sensor housing of claim 7, wherein the natural frequency of the elongated body is above first two engine orders of the gas turbine engine system in an operational range of a rotational speed of the gas turbine engine system.

9. The sensor housing of claim 8, wherein the natural frequency of the elongated body is above a selected set of engine drivers associated with one of the selected set of engine orders.

10. A sensor apparatus for a gas turbine engine system, including:
a sensor housing coupled to the gas turbine engine system, the sensor housing including an elongated body having an axial dimension determined according to a vibration characteristic of the gas turbine engine system during operation, wherein a natural frequency of the elongated body of the sensor housing is set above a selected set of engine orders of the gas turbine engine system in an operational range of a rotational speed of the gas turbine engine system;
a sensor disposed within the sensor housing; and
a mounting nut configured to secure the sensor within the sensor housing.

11. The apparatus of claim 10, wherein the selected set of engine orders includes at least the first two engine orders.

12. The apparatus of claim 10, wherein:
the gas turbine engine system includes a torch housing; and
the torch housing includes the sensor apparatus.

13. The apparatus of claim 10, wherein the sensor housing includes:
an opening disposed axially within the elongated body and configured to receive the sensor; and
a support section coupled to the elongated body and configured to secure the sensor housing to a torch housing of the gas turbine engine system through a receiving port disposed thereon.

14. The apparatus of claim 13, wherein:
the opening is disposed through the support section; and
a head section of the sensor extends through a side wall of the torch housing when received by the opening.

15. A method for measuring pressure within a gas turbine engine system, including:
selecting one or more engine orders of a gas turbine engine system;
selecting an axial dimension of an elongated body of a sensor housing according to a vibration characteristic of the gas turbine engine system, wherein a natural frequency of the sensor housing is set above the selected engine orders in an operational range of a rotational speed of the gas turbine engine system;
coupling the sensor housing to the gas turbine engine system;
disposing a sensor within the sensor housing;
securing the sensor within the sensor housing by a mounting nut coupled to the sensor housing; and
collecting pressure measurements from the sensor.

16. The method of claim 15, further including determining the axial dimension of the elongated body according to the selected engine orders.

17. The method of claim 16, further including determining the axial dimension of the elongated body using a finite element analysis.

* * * * *